United States Patent
Iizuka et al.

(10) Patent No.: US 10,724,426 B2
(45) Date of Patent: Jul. 28, 2020

(54) ELECTRIC TURBOCHARGER

(71) Applicant: IHI Corporation, Koto-ku (JP)

(72) Inventors: Kuniaki Iizuka, Koto-ku (JP); Takashi Yoshida, Koto-ku (JP); Yuji Sasaki, Koto-ku (JP); Tatsumi Inomata, Koto-ku (JP); Takuya Ozasa, Koto-ku (JP); Tomohisa Okada, Koto-ku (JP); Ryosuke Yumoto, Koto-ku (JP); Kouta Kimachi, Koto-ku (JP)

(73) Assignee: IHI Corporation, Koto-ku (JP)

( * ) Notice: Subject to any disclaimer, the term of this patent is extended or adjusted under 35 U.S.C. 154(b) by 16 days.

(21) Appl. No.: 16/306,641

(22) PCT Filed: May 16, 2017

(86) PCT No.: PCT/JP2017/018388
§ 371 (c)(1),
(2) Date: Dec. 3, 2018

(87) PCT Pub. No.: WO2018/012104
PCT Pub. Date: Jan. 18, 2018

(65) Prior Publication Data
US 2019/0120125 A1   Apr. 25, 2019

(30) Foreign Application Priority Data

Jul. 15, 2016   (JP) .................................. 2016-140183

(51) Int. Cl.
| | |
|---|---|
| *F02B 33/40* | (2006.01) |
| *F02B 39/10* | (2006.01) |
| *F02B 37/10* | (2006.01) |
| *F04D 25/06* | (2006.01) |
| *F04B 39/00* | (2006.01) |
| *H01R 9/16* | (2006.01) |
| *H01R 13/533* | (2006.01) |
| *F04D 15/00* | (2006.01) |
| *F04D 29/00* | (2006.01) |

(52) U.S. Cl.
CPC .............. *F02B 33/40* (2013.01); *F02B 37/10* (2013.01); *F02B 39/10* (2013.01); *F04B 39/00* (2013.01);
(Continued)

(58) Field of Classification Search
CPC .......... F02B 33/40; F02B 37/10; F02B 39/10; F04B 39/00; F04D 15/0066; F04D 25/068;
(Continued)

(56) References Cited

U.S. PATENT DOCUMENTS

| | | | |
|---|---|---|---|
| 2003/0002998 A1 | 1/2003 | Makino et al. | |
| 2010/0021320 A1 | 1/2010 | Watanabe et al. | |

(Continued)

FOREIGN PATENT DOCUMENTS

| | | |
|---|---|---|
| CN | 102472163 A | 5/2012 |
| JP | 2002-364536 A | 12/2002 |

(Continued)

OTHER PUBLICATIONS

International Search Report dated Aug. 8, 2017 in PCT/JP2017/018388, 2 pages.

*Primary Examiner* — Brandon D Lee
(74) *Attorney, Agent, or Firm* — Oblon, McClelland, Maier & Neustadt, L.L.P.

(57) ABSTRACT

An electric turbocharger includes an electric motor which rotationally drives a rotating blade, a motor housing which accommodates the electric motor therein, a controller which is disposed outside the motor housing and controls the driving of the electric motor, and a power supply mechanism which supplies a current from the controller to the electric motor through a through-hole communicating the inside and the outside of the motor housing, in which the power supply mechanism includes a rod which is hermetically sealed while being inserted through the through-hole, a connector which is connected to at least one end of the rod, and a busbar which is connected to the connector, and in which the connector absorbs a relative positional displacement of the rod with respect to the connector.

6 Claims, 7 Drawing Sheets

(52) U.S. Cl.
CPC ....... *F04D 15/0066* (2013.01); *F04D 25/068* (2013.01); *F04D 25/0693* (2013.01); *F04D 29/002* (2013.01); *H01R 9/16* (2013.01); *H01R 13/533* (2013.01)

(58) Field of Classification Search
CPC . F04D 25/0693; F04D 29/002; H01R 13/533; H01R 9/16
See application file for complete search history.

(56) References Cited

U.S. PATENT DOCUMENTS

| | | |
|---|---|---|
| 2012/0141307 A1 | 6/2012 | Kinoshita et al. |
| 2013/0049550 A1 | 2/2013 | Watanabe et al. |
| 2014/0024232 A1 | 1/2014 | Wehrle et al. |
| 2016/0020657 A1 | 1/2016 | Hattori et al. |

FOREIGN PATENT DOCUMENTS

| | | | |
|---|---|---|---|
| JP | 2003-214340 A | | 7/2003 |
| JP | 2003214340 A | * | 7/2003 |
| JP | 2008-232133 A | | 10/2008 |
| JP | 2011-163231 A | | 8/2011 |
| JP | 2012-117479 A | | 6/2012 |
| JP | 2014-22368 A | | 2/2014 |
| JP | 2014-217223 A | | 11/2014 |
| JP | 2015-115969 A | | 6/2015 |
| WO | WO 98/30790 A2 | | 7/1998 |
| WO | WO 2008/102697 A1 | | 8/2008 |
| WO | WO 2015/188028 A2 | | 12/2015 |

* cited by examiner

Fig.2
(a)
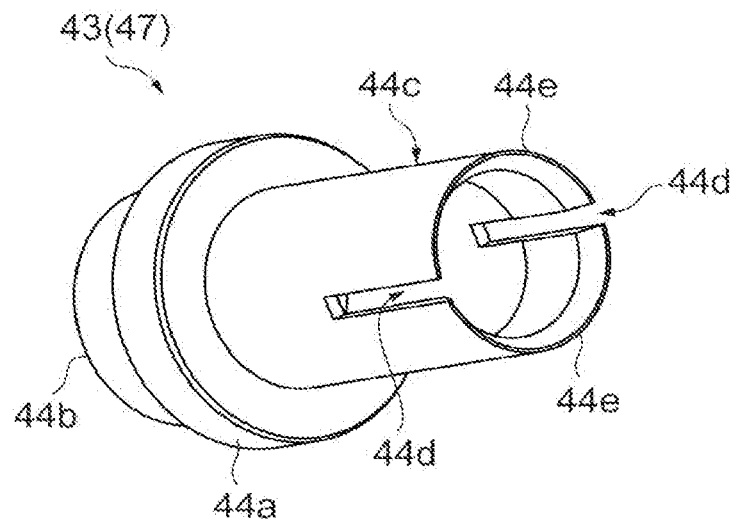
(b)
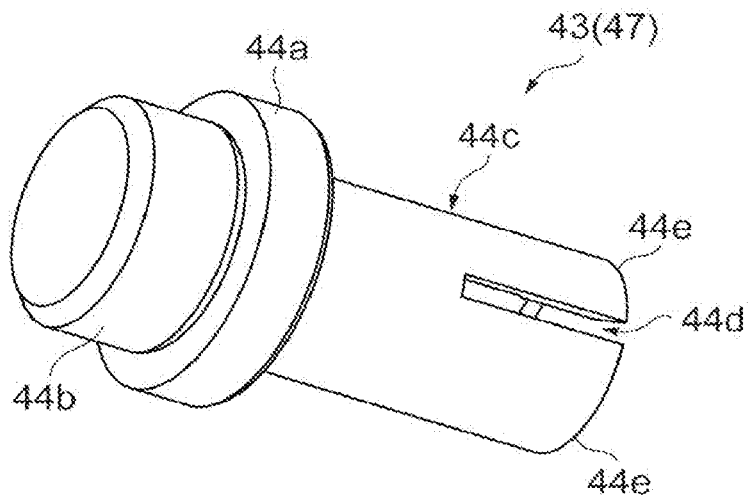

Fig.7
(a)
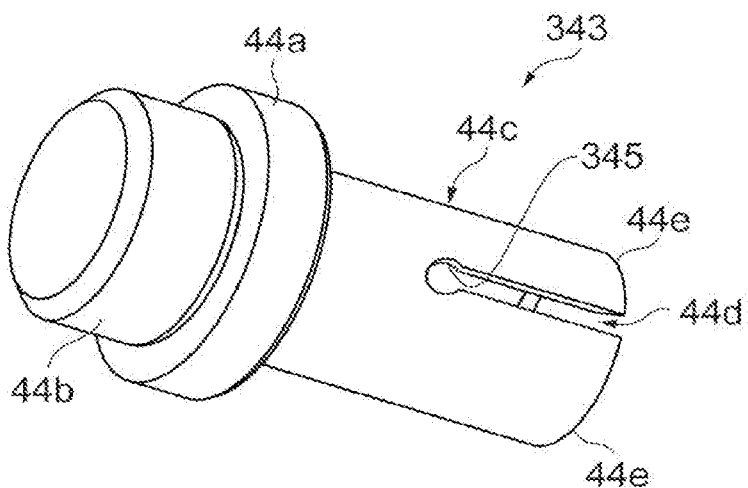
(b)
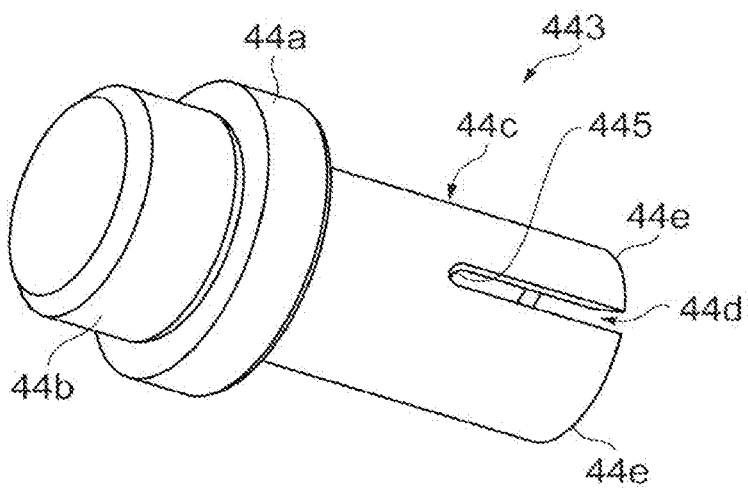

ELECTRIC TURBOCHARGER

TECHNICAL FIELD

The present disclosure relates to an electric turbocharger.

BACKGROUND ART

Patent Literature 1 discloses an electric compressor in which a compressor and an electric motor are integrated with each other. The electric compressor includes a housing including a middle casing that accommodates the compressor, a rear casing that accommodates the electric motor, and a front casing that accommodates a drive circuit. Then, the drive circuit and the electric motor are electrically connected to each other by a signal line via a hermetically sealed terminal fixed to the housing.

CITATION LIST

Patent Literature

Patent Literature 1: International Publication No. WO2008/102697

SUMMARY OF INVENTION

Technical Problem

Generally, in the hermetically sealed terminal, the periphery of a conduction rod is sealed by an insulator such as glass. In this case, when the signal line connected to the rod is a flexible thin line, no excessive force is applied from the signal line to the rod even when a relative positional displacement occurs between the rod and the signal line. However, since a large current is necessary for an electric motor used in an electric turbocharger, a highly rigid busbar is connected to the rod instead of the flexible thin line. In this case, for example, when a relative positional displacement occurs between the busbar and the rod during the connection, there is concern that a glass portion may be broken since an excessive force is applied to the rod while the rod is pressed by the busbar.

The present disclosure will describe an electric turbocharger capable of suppressing the breakage of the glass portion in the hermetically sealing.

Solution to Problem

An electric turbocharger of an embodiment includes: an electric motor which rotationally drives a rotating blade; a motor housing which accommodates the electric motor therein; a controller which is disposed outside the motor housing and controls the driving of the electric motor; and a power supply mechanism which supplies a current from the controller to the electric motor through a through-hole communicating the inside and the outside of the motor housing, in which the power supply mechanism includes a rod which is hermetically sealed while being inserted through the through-hole, a connector which is connected to at least one end of the rod, and a busbar which is connected to the connector, and in which the connector absorbs a relative positional displacement of the rod with respect to the connector.

Effects of Invention

According to the electric turbocharger of an embodiment, it is possible to suppress the breakage of the glass portion in the hermetical sealing.

BRIEF DESCRIPTION OF DRAWINGS

FIG. 2 is a perspective view illustrating a connector before the connector is connected to a busbar.

FIG. 7 is a perspective view illustrating a connector according to the modified example.

DESCRIPTION OF EMBODIMENTS

Figure 1:
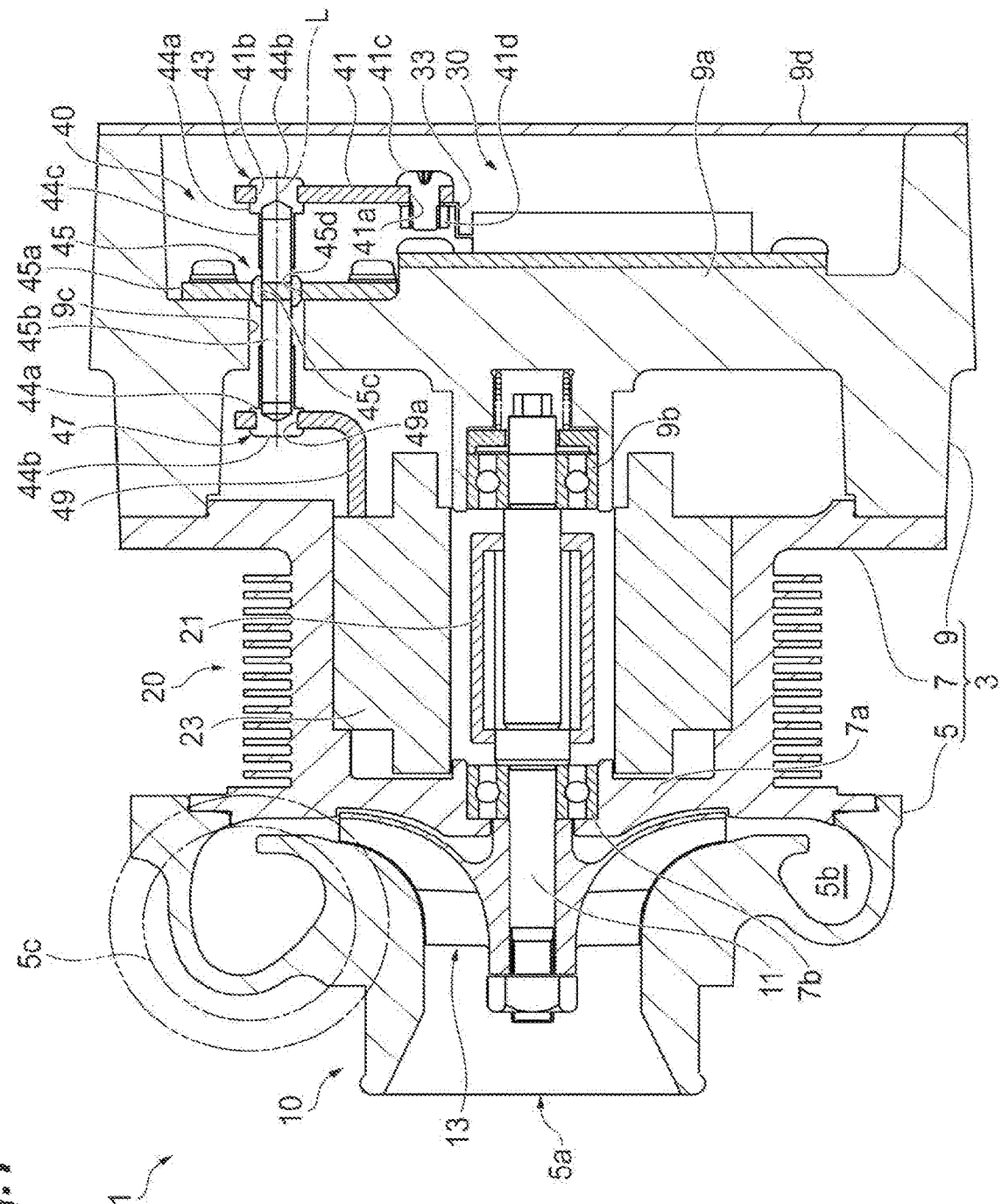
FIG. 1 is a cross-sectional view illustrating an electric turbocharger according to an embodiment.

An electric turbocharger of an embodiment includes: an electric motor which rotationally drives a rotating blade; a motor housing which accommodates the electric motor therein; a controller which is disposed outside the motor housing and controls the driving of the electric motor; and a power supply mechanism which supplies a current from the controller to the electric motor through a through-hole communicating the inside and the outside of the motor housing, in which the power supply mechanism includes a rod which is hermetically sealed while being inserted through the through-hole, a connector which is connected to at least one end of the rod, and a busbar which is connected to the connector, and in which the connector absorbs a relative positional displacement of the rod with respect to the connector.

In such an electric turbocharger, the hermetically sealed rod is connected to the connector connected to the busbar. When the position of the rod is relatively displaced from the busbar, the position of the rod with respect to the connector connected to the busbar is also displaced. In this case, in the related art, an excessive force is applied to the rod when the connector and the rod are connected to each other. However, since the connector can absorb the relative positional displacement of the rod, it is possible to suppress an excessive force applied to the rod. Thus, it is possible to suppress the breakage of the glass portion in the hermetical sealing.

Further, the connector may include a cylindrical portion and may be provided with one or a plurality of slits along an axial direction. According to this configuration, since the slit is formed in the cylindrical portion, the cylindrical portion is easily deformed. For that reason, even when the rod displaced relative to the busbar is connected to the connector, it is possible to absorb the relative positional displacement of the rod by the deformation of the cylindrical portion.

Further, the connector may be connected to each of both ends of the rod, the connector connected to one end of the rod may be a first connector, and the connector connected to the other end of the rod may be a second connector. Then, a circumferential position of the slit of the first connector and a circumferential position of the slit of the second connector may be displaced from each other as viewed in the axial direction of the rod. The cylindrical portion is easily deformed in a direction in which the slit is widened. For that reason, since the circumferential positions of the slits of the first connector and the second connector are displaced from each other, the cylindrical portion deformable directions are displaced from each other and thus the positional displacement of the rod can be easily handled.

Further, a plurality of slits may be formed in the cylindrical portion of the first connector at the same pitches in the circumferential direction, a plurality of slits may be formed in the cylindrical portion of the second connector as many as the slits of the first connector at the same pitches in the circumferential direction, and the slit of the first connector and the slits of the second connector may be alternately arranged as viewed in the axial direction of the rod. According to this configuration, the slit widening directions of the first connector and the second connector are arranged alternately in the circumferential direction. Accordingly, even when the rod is displaced to any direction of the radial direction, the positional displacement of the rod can be easily absorbed.

Further, a pair of the slits may be formed at opposite positions in the circumferential direction of the cylindrical portion of the first connector, a pair of the slits may be formed at opposite positions of the circumferential direction of the cylindrical portion of the second connector, and the circumferential positions of the pair of slits of the first connector and the circumferential positions of the pair of slits of the second connector may be displaced from each other by 90° as viewed in the axial direction of the rod. According to this configuration, since the first connector includes a direction in which the slit is easily widened in one direction of the radial direction and the second connector includes a direction in which the slit is easily widened in a direction orthogonal to the one direction of the radial direction, the positional displacement of the rod can be easily absorbed. Further, since the number of the slits formed in the cylindrical portion is limited, the rigidity of the cylindrical portion can be secured.

Further, an electric turbocharger of an embodiment includes: an electric motor which rotationally drives a rotating blade; a motor housing which accommodates the electric motor therein; a controller which is disposed outside the motor housing and controls the driving of the electric motor, and a power supply mechanism which supplies a current from the controller to the electric motor through a through-hole communicating the inside and the outside of the motor housing, in which the power supply mechanism includes a rod which is hermetically sealed while being inserted through the through-hole, a first connector which is connected to one end of the rod and is provided with one or a plurality of slits along an axial direction, a second connector which is connected to the other end of the rod and is provided with one or a plurality of slits along the axial direction, a first busbar which is connected to the first connector, and a second busbar which is connected to the second connector, and in which the circumferential positions of the slit of the first connector and the slit of the second connector with respect to the rod do not match each other.

In such an electric turbocharger, since the slits formed in the first connector and the second connector can absorb the relative positional displacement of the rod, it is possible to suppress an excessive force applied to the rod. Thus, it is possible to suppress the breakage of the glass portion in the hermetical sealing. Further, since the circumferential positions of the slits of the first connector and the slits of the second connector do not match one another, the positional displacement of the rod can be easily absorbed even when the rod is displaced to any direction of the radial direction.

Hereinafter, an embodiment according to the present disclosure will be described in detail with reference to the drawings. For the sake of convenience, the same reference numerals will be given to the substantially same components and the description thereof will be omitted.

FIG. 1 is a cross-sectional view illustrating an electric turbocharger according to an embodiment. The electric turbocharger 1 is applied to an internal combustion engine used in, for example, a vehicle, a ship, and the like. As illustrated in FIG. 1, the electric turbocharger 1 includes a compressor 10, an electric motor 20, and an inverter (a controller) 30. The compressor 10, the electric motor 20, and the inverter 30 are accommodated in a housing 3. The housing 3 includes a compressor housing 5, a motor housing 7, and an inverter housing 9. The electric turbocharger 1 generates compressed air by rotationally driving the compressor 10 using the electric motor 20 controlled by the inverter 30. The compressed air is supplied to the above-described internal combustion engine.

The compressor 10 includes the compressor housing 5, a rotation shaft 11 which is rotatably supported inside the compressor housing 5, and a compressor impeller (a rotating blade) 13 which is attached to one end of the rotation shaft 11. The compressor impeller 13 is formed of, for example, resin or carbon fiber reinforced resin and hence is decreased in weight. The compressor housing 5 includes a suction port 5a which takes air into the compressor impeller 13, a scroll portion 5b which receives air compressed by the compressor impeller 13, and an ejection port 5c which ejects compressed air.

The electric motor 20 includes the rotation shaft 11 which is rotatably supported inside the motor housing 7, a rotor portion 21 which is attached to the rotation shaft 11, and a stator portion 23 which surrounds the rotor portion 21. The motor housing 7 is attached to one end side (the right side of the drawing) of the compressor housing 5 by a bolt (not illustrated). The other end side of the rotation shaft 11 supported inside the compressor housing 5 extends inside the motor housing 7. A ball bearing 7b which supports the rotation shaft 11 is disposed in a wall portion 7a on the side of the compressor 10 in the motor housing 7.

The rotor portion 21 includes one or a plurality of permanent magnets (not illustrated) attached to the rotation shaft 11. The stator portion 23 is held by the inner surface of the motor housing 7 and includes a coil for generating a magnetic field. A motor side busbar 49 which constitutes a part of a power supply mechanism 40 to be described later is electrically connected to the coil of the stator portion 23. The motor side busbar 49 is attached to, for example, the stator portion 23 or the like to be disposed at a predetermined position inside the motor housing 7. For example, a coil may be formed by winding the motor side busbar 49. In this case, the position of the motor side busbar 49 with respect to the stator portion 23 is determined. Further, the motor side busbar 49 electrically connected to the coil may be attached to the motor housing 7 by an attachment member or the like.

The inverter 30 is disposed inside the inverter housing 9 which is the outside of the motor housing 7 (the opposite side to the compressor housing 5). The inverter 30 converts DC power supplied from a battery (not illustrated) mounted on a vehicle or the like into three-phase AC power. For that reason, the inverter 30 is provided with three output terminals 33 (only one is illustrated in FIG. 1) corresponding to a three-phase AC current. The inverter housing 9 is attached to one end side (the right side of the drawing) of the motor housing 7. A ball bearing 9b which supports the rotation shaft 11 is disposed at a wall portion 9a on the side of the motor housing 7 in the inverter housing 9. Further, the wall portion 9a is provided with three through-holes 9c (only one is illustrated in FIG. 1) communicating the inside of the inverter housing 9 and the inside of the motor housing 7. An AC current output from the inverter 30 is supplied to the stator portion 23 of the electric motor 20 by the power supply mechanism 40 passing through the through-hole 9c. In addition, a space inside the inverter housing 9 is closed by a lid 9d.

Figure 3:
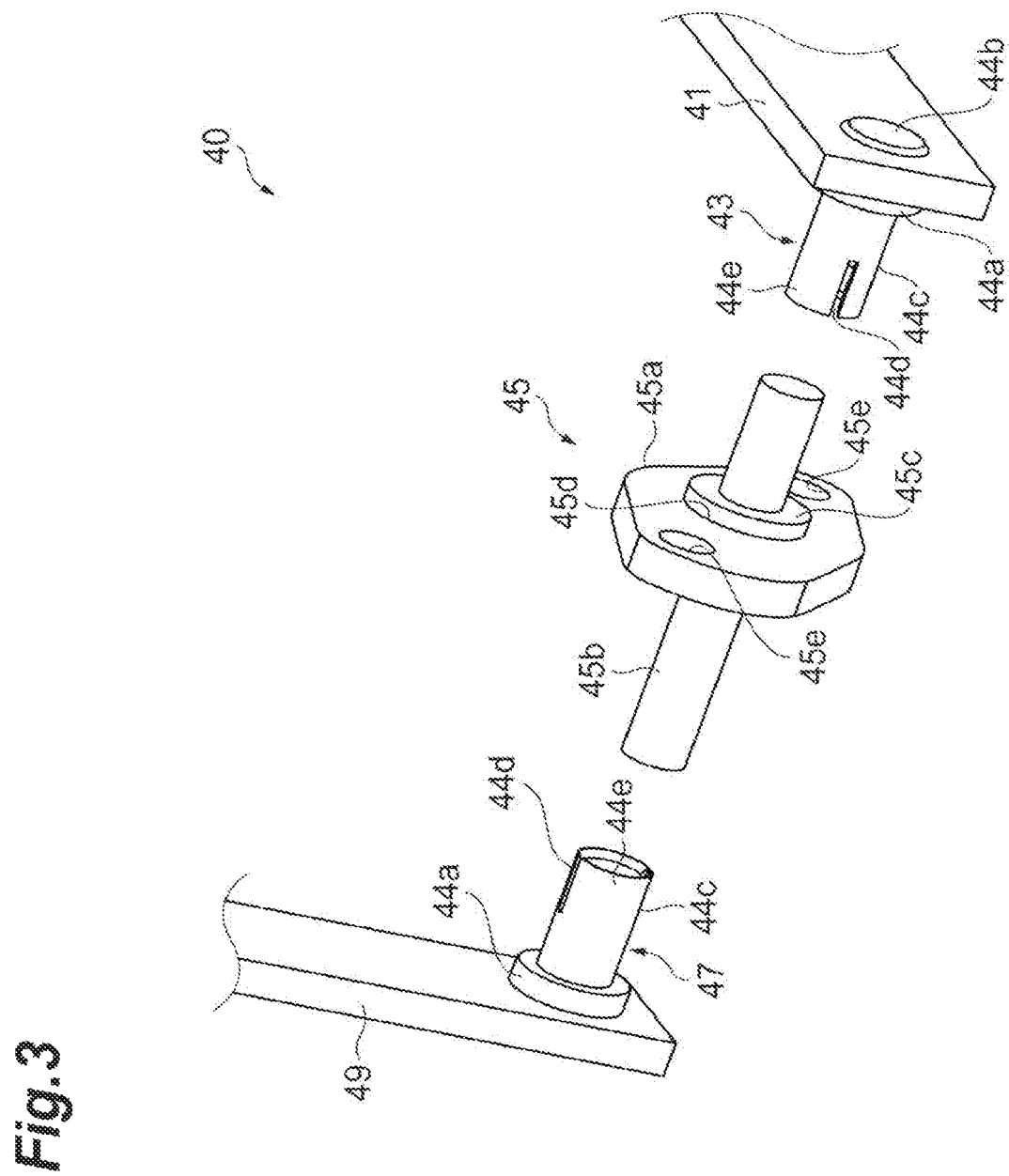
FIG. 3 is an exploded perspective view illustrating the connector connected to the busbar and a hermetically sealed rod.
Figure 4:
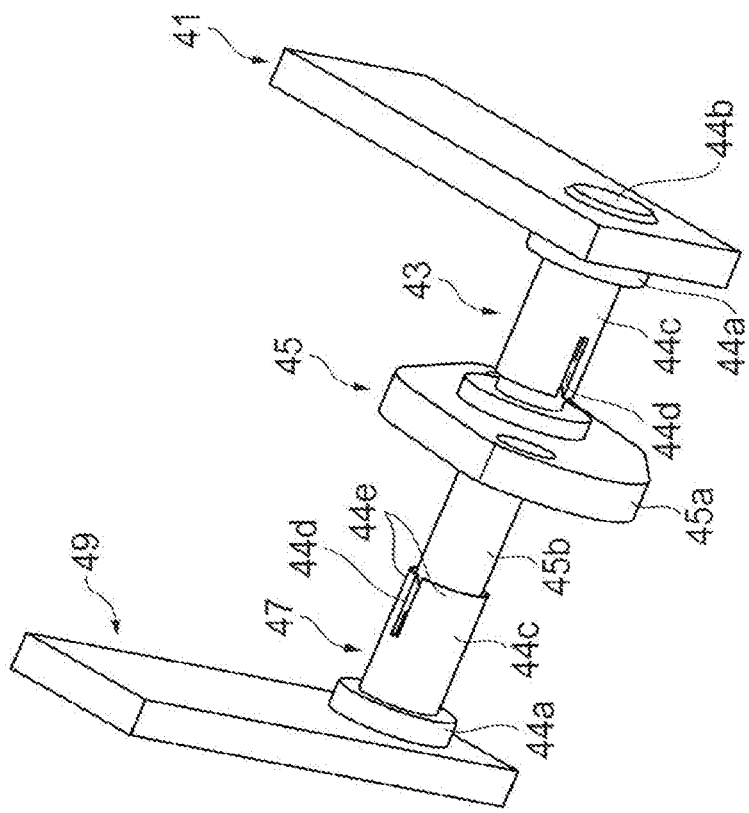
FIG. 4 is a perspective view illustrating an assembly image of the connector connected to the busbar and the hermetically sealed rod.

FIG. 2 is a perspective view illustrating an inverter side connector 43 which is not attached to the inverter side busbar 41. FIG. 3 is an exploded perspective view illustrating the power supply mechanism 40. FIG. 4 is a perspective view illustrating an assembly image of the power supply mechanism 40. The power supply mechanism 40 includes an inverter side busbar (a first busbar) 41, an inverter side connector (a first connector) 43, a hermetic terminal 45, a motor side connector (a second connector) 47, and a motor side busbar (a second busbar) 49. The inverter side busbar 41 is an elongated plate-shaped member and is formed of a metal material such as copper. Both ends of the inverter side busbar 41 in the longitudinal direction are provided with attachment hole portions 41a and 41b (see FIG. 1). One hole portion 41a is connected to the output terminal 33 of the inverter 30 by a bolt 41c and a nut 41d. Accordingly, the output terminal 33 of the inverter 30 is electrically connected to the inverter side busbar 41. The inverter side connector 43 is connected to the other hole portion 41b.

The inverter side connector 43 is formed of a metal material such as copper. As illustrated in FIG. 2, the inverter side connector 43 includes a disk-shaped base portion 44a, a columnar fastening portion 44b which protrudes to one surface side of the base portion 44a, and a cylindrical portion 44c which is uprightly formed on the other surface side of the base portion 44a. As illustrated in FIG. 1, the outer diameter of the base portion 44a is set to be larger than the diameter of the hole portion 41b formed in the inverter side busbar 41. The outer diameter of the fastening portion 44b is set to be smaller than the diameter of the hole portion 41b. Further, the height of the fastening portion 44b is set to be larger than the thickness of the inverter side busbar 41. The inverter side connector 43 is attached to the inverter side busbar 41 by, for example, crimping the fastening portion 44b inserted through the hole portion 41b.

As illustrated in FIGS. 2 to 4, a slit 44d is formed in the cylindrical portion 44c from a front end to a base end along the axial direction. Accordingly, an arc piece 44e is formed at a front end side of the cylindrical portion 44c as many as the slits 44d. In the embodiment, a pair of slits 44d is formed at the facing positions of the cylindrical portion 44c in the circumferential direction. Further, the slit 44d is formed in a range from the substantial center to the front end of the cylindrical portion 44c in the axial direction. Accordingly, a pair of arc pieces 44e is formed at the front end side in relation to the substantial center of the cylindrical portion 44c in the axial direction. The arc piece 44e is formed in a substantially semi-circular arc shape as viewed in the axial direction. The cylindrical portion 44c has flexibility particularly at a portion provided with the arc piece 44e. For that reason, when an external force is applied to the arc piece 44e outward in the radial direction, the arc piece 44e can be deformed outward in the radial direction. One end of the hermetic terminal 45 is inserted and held by the cylindrical portion 44c.

Further, an inclined surface may be provided on the inner peripheral surface on the front end side of the cylindrical portion 44c. When the inclined surface is provided, the inclined surface becomes a guide at the time of inserting the hermetic terminal 45 and is aligned to the inner peripheral surface of the cylindrical portion 44c. For this reason, the hermetic terminal 45 can be easily inserted. FIG. 2(a) illustrates an example in which two inclined surfaces having different inclination angles are formed to have large inclination angles at the front end side, but the present disclosure is not limited thereto.

The hermetic terminal 45 includes a plate 45a and a rod 45b. The rod 45b is hermetically sealed while being inserted through an insertion hole 45d formed in the plate 45a (see FIG. 1). That is, an insulator 45c such as glass is filled into the insertion hole 45d so that the rod 45b and the plate 45a do not contact each other. The plate 45a is provided with two holes 45e through which screws or the like can be inserted. The plate 45a is attached to the wall portion 9a while the rod 45b is inserted through the through-hole 9c formed in the inverter housing 9. Accordingly, one end side of the rod 45b is located inside the inverter housing 9 and the other end side of the rod 45b is located inside the motor housing 7. Additionally, a gap between the plate 45a and the wall portion 9a can be sealed by an O-ring or the like.

The rod 45b is a rod member having the substantially same diameter as the inner diameter of the cylindrical portion 44c and is formed of a metal material such as copper. One end side of the rod 45b is disposed inside the cylindrical portion 44c of the inverter side connector 43. Accordingly, the outer peripheral surface of the rod 45b is electrically connected to the inner peripheral surface of the cylindrical portion 44c. The other end side of the rod 45b is connected to the motor side connector 47 inside the motor housing 7.

As illustrated in FIGS. 3 and 4, the motor side connector 47 is formed in the substantially same shape as that of the inverter side connector 43 and is formed of a metal material such as copper. That is, the motor side connector 47 includes a base portion 44a, a cylindrical portion 44c, and a fastening portion 44b. Further, the cylindrical portion 44c is provided with a pair of slits 44d similarly to the inverter side connector 43. Accordingly, the cylindrical portion 44c is provided with a pair of arc pieces 44e. The other end side of the rod 45b is disposed inside the cylindrical portion 44c of the motor side connector 47. Accordingly, the outer peripheral surface of the rod 45b is electrically connected to the inner peripheral surface of the cylindrical portion 44c.

Similarly to the inverter side busbar 41, the motor side busbar 49 is, for example, an elongated plate-shaped member and is formed of a metal material such as copper. One end of the motor side busbar 49 is provided with a hole portion 49a for attaching the motor side connector 47 (see FIG. 1). For example, the fastening portion 44b of the motor side connector 47 is attached to the hole portion 49a by crimping. Accordingly, the motor side connector 47 and the motor side busbar 49 are electrically connected to each other. The other end of the motor side busbar 49 is electrically connected to the coil of the stator portion 23 as described above. In the above-described power supply mechanism 40, a current supplied from the output terminal 33 of the inverter 30 is sent to the coil of the stator portion 23 while passing through the inverter side busbar 41, the inverter side connector 43, the rod 45b, the motor side connector 47, and the motor side busbar 49.

Figure 5:
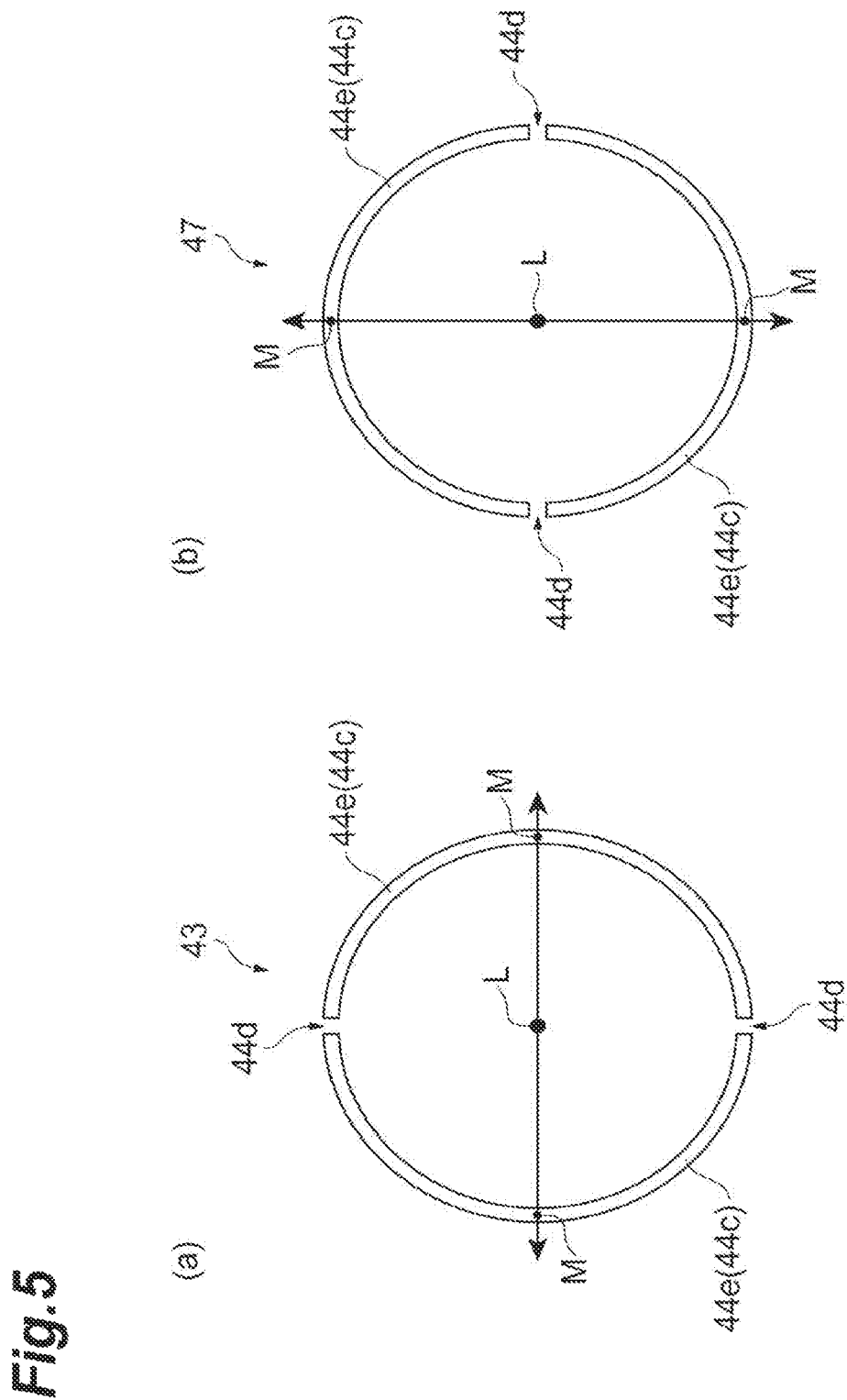
FIG. 5 is a schematic diagram describing a position of a slit of a cylindrical portion as viewed from an axial direction.

FIG. 5 is a schematic diagram illustrating a position of the slit 44d of the cylindrical portion 44c as viewed from the axis L, FIG. 5(a) illustrates the inverter side connector 43, and FIG. 5(b) illustrates the motor side connector 47. As illustrated in FIG. 5, the circumferential position of the slit 44d of the inverter side connector 43 and the circumferential position of the slit 44d of the motor side connector 47 are displaced from each other. When the same number of slits 44d are formed at the same pitches in the cylindrical portion 44c of the motor side connector 47 and the cylindrical portion 44c of the inverter side connector 43, the slit 44d of the inverter side connector 43 and the slit 44d of the motor side connector 47 can be alternately arranged at the same pitches as viewed in the axial direction. In the embodiment, a pair of slits 44d is formed at facing positions in the circumferential direction in both of the motor side connector 47 and the inverter side connector 43. That is, the slits 44d are formed at the pitch of 180° in the circumferential direction of the cylindrical portion 44c. Here, as illustrated in FIG. 5, the circumferential positions of the pair of slits 44d of the motor side connector 47 and the circumferential positions of the pair of slits 44d of the inverter side connector 43 are arranged to be displaced from each other by 90°. Accordingly, the slit 44d of the motor side connector 47 and the slit 44d of the inverter side connector 43 are alternately arranged at the pitch of 90°.

As indicated by the arrow of FIG. 5, the arc piece 44e is easily deformed in a direction connecting the axis L and the circular-arc center point M of the arc piece 44e. As in the example illustrated in the drawings, when the slit 44d of the inverter side connector 43 and the slit 44d of the motor side connector 47 are disposed to be displaced by 90°, a direction in which the arc piece 44e is easily deformed is also alternately arranged in the inverter side connector 43 and the motor side connector 47 at the pitch of 90°.

In the above-described electric turbocharger 1, the motor side connector 47 connected to the motor side busbar 49 is connected to one end of the hermetically sealed rod 45b and the inverter side connector 43 connected to the inverter side busbar 41 is connected to the other end of the rod 45b. In this case, an excessive external force is not applied to the rod 45b in a state in which a positional displacement of the motor side connector 47 and the inverter side connector 43 with respect to the rod 45b does not exist. That is, an excessive external force is not applied to the rod 45b in a state in which the axis of the motor side connector 47, the axis of the rod 45b, and the axis of the inverter side connector 43 are aligned.

Meanwhile, when the position of the rod 45b is relatively displaced with respect to any one of the inverter side connector 43 and the motor side connector 47, in the related art, an excessive force is applied to the rod 45b at the time of connecting the rod 45b. In the embodiment, the inverter side connector 43 and the motor side connector 47 can absorb the relative positional displacement of the rod 45b. That is, it is possible to electrically connect the rod 45b and the connector to each other without applying an excessive force to the rod 45b while the axis of the motor side connector 47, the axis of the rod 45b, and the axis of the inverter side connector 43 are displaced from one another. Thus, it is possible to suppress the breakage of the glass portion in the hermetical sealing.

The inverter side connector 43 and the motor side connector 47 include the flexible cylindrical portion 44c which is formed of a metal material. Then, the cylindrical portion 44c is provided with the slit 44d along the axial direction. That is, the arc piece 44e is formed at the front end side of the cylindrical portion 44c. When the position of the rod 45b is displaced from the connector in the radial direction, it is possible to absorb the positional displacement of the rod 45b in such a manner that the flexible arc piece 44e is deformed outward in the radial direction.

Further, since the position of the slit 44d of the inverter side connector 43 and the position of the slit 44d of the motor side connector 47 are displaced from each other in the circumferential direction as viewed in the axial direction of the rod 45b, the position of the arc piece 44e is also displaced in the circumferential direction. Accordingly, since a direction in which the arc piece 44e is easily widened is displaced from each other in the inverter side connector 43 and the motor side connector 47, it is possible to easily handle the positional displacement of the rod 45b.

In the embodiment, as viewed in the axial direction of the rod 45b, the circumferential positions of the pair of slits 44d of the inverter side connector 43 and the circumferential positions of the pair of slits 44d of the motor side connector 47 are displaced from each other by 90°. For that reason, a direction in which the arc piece 44e is easily widened in the inverter side connector 43 and a direction in which the arc piece 44e is easily widened in the motor side connector 47 are alternately arranged at the pitch of 90°. For this reason, the positional displacement is easily absorbed even when the rod 45b is displaced to any direction of the radial direction. Further, since the number of the slits 44d formed in the cylindrical portion 44c is two, the arc piece 44e is formed in a semi-circular arc shape. Accordingly, the rigidity of the arc piece 44e can be ensured.

Hereinbefore, the embodiment of the present disclosure has been described in detail with reference to the drawings, but the specific configuration is not limited to the embodiment.

Figure 6:
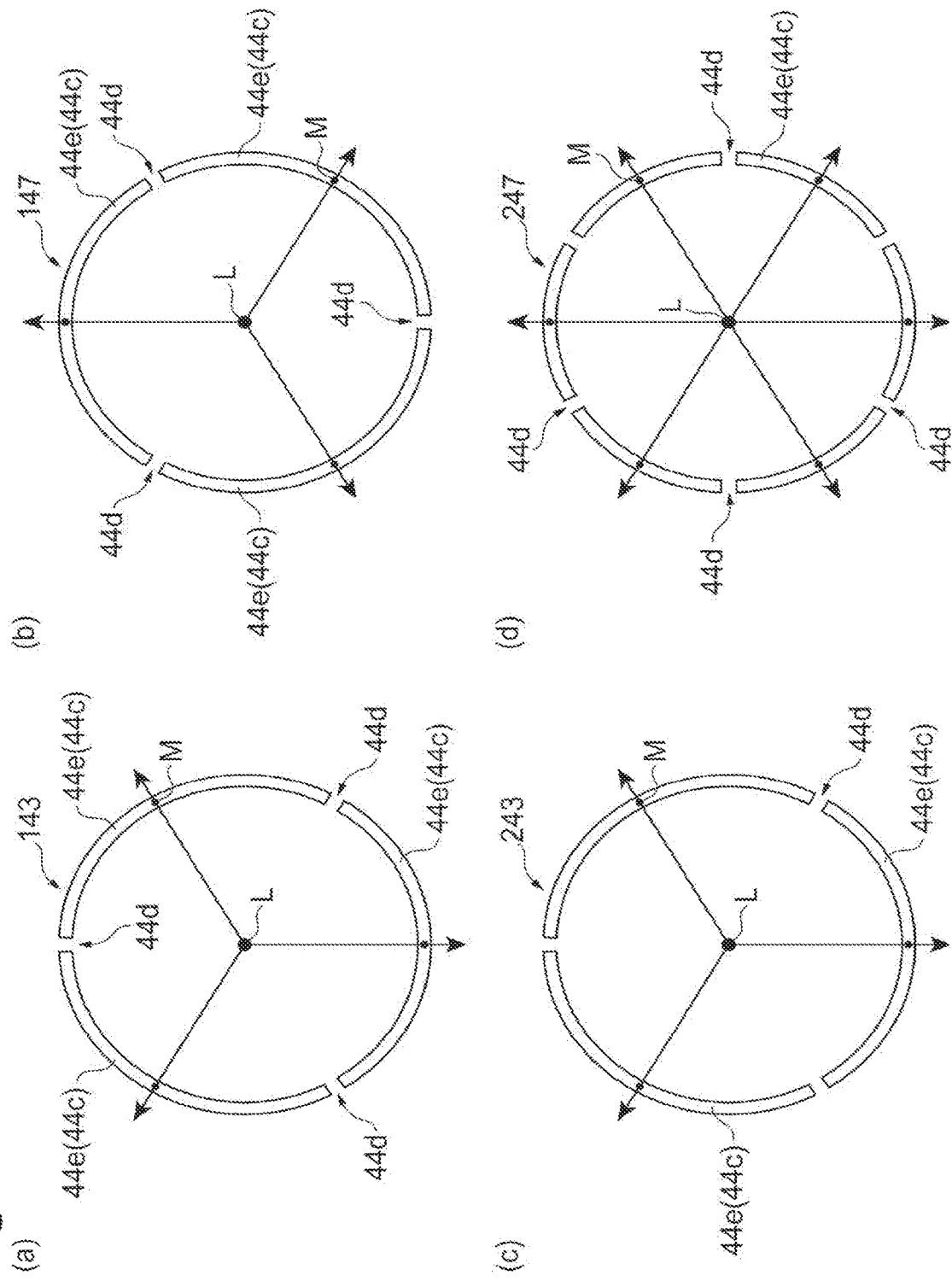
FIG. 6 is a schematic diagram describing a position of a slit of a cylindrical portion according to a modified example.

For example, an example has been described in which two slits 44d are formed in the cylindrical portion 44c of any one of the inverter side connector 43 and the motor side connector 47, but the present disclosure is not limited thereto. For example, the cylindrical portion may be provided with one slit or three or more slits. An example is illustrated in FIG. 6. FIG. 6(a) is a schematic diagram showing the arc piece 44e of the inverter side connector 143 and FIG. 6(b) is a schematic diagram illustrating the arc piece 44e of the motor side connector 147.

Further, in the example of FIG. 5, an example has been described in which the pair of slits 44d is provided in the cylindrical portion 44c of the inverter side connector 43 and the cylindrical portion 44c of the motor side connector 47 and the circumferential positions are displaced from each other by 90°, but the present disclosure is not limited thereto. For example, when the circumferential positions of the slits 44d formed in the cylindrical portion 44c are slightly displaced from each other between the inverter side connector 43 and the motor side connector 47, the relative positional displacement of the rod 45b is easily absorbed compared to a case in which the circumferential positions of the slits 44d are the same.

In the modified example of FIG. 6, three slits 44d are formed at the same pitches in the cylindrical portion 44c of any one of the inverter side connector 143 and the motor side connector 147. Accordingly, each cylindrical portion 44c is provided with three arc pieces 44e. The slit 44d of the inverter side connector 143 and the slit 44d of the motor side connector 147 are alternately arranged at the same pitches in the circumferential direction. Further, a direction in which the arc piece 44e is easily widened (indicated by the arrow in the drawing) is alternately arranged in the circumferential direction of the inverter side connector 143 and the motor side connector 147. Accordingly, even when the rod 45b is displaced to any direction of the radial direction, the positional displacement of the rod 45b is easily absorbed.

Further, FIGS. 6(c) and 6(d) illustrate an example in which the number of the slits 44d formed in the cylindrical portion 44c is different in the inverter side connector 243 and the motor side connector 247. In the example illustrated in the drawings, three slits 44d are formed at the same pitches in the cylindrical portion 44c of the inverter side connector 243 (see FIG. 6(c)) and six slits 44d are formed at the same pitches in the cylindrical portion 44c of the motor side connector 247 (see FIG. 6(d)). As indicated by the arrow of the drawings, three of directions in which the arc piece 44e is easily widened in the motor side connector 247 overlap directions in which the arc piece 44e is easily widened in the inverter side connector 243. Meanwhile, the other three of directions in which the arc piece 44e is easily widened in the motor side connector 47 are alternately arranged at the same pitches along with the directions in which the arc piece 44e is easily widened in the inverter side connector 43. Accordingly, even when the rod 45b is displaced to any direction of the radial direction, the positional displacement of the rod 45b is easily absorbed.

Further, the present disclosure is not limited to a case in which the plurality of slits is formed in the cylindrical portion 44c at the same pitches. For example, the plurality of slits may be formed at different pitches. That is, the plurality of arc pieces formed in the cylindrical portion 44c may have different sizes. In this case, the circumferential positions of the slits formed in the cylindrical portions 44c of the inverter side connector 43 and the motor side connector 47 may be different from each other. However, when the slits are provided at the same pitches, the arc piece is easily deformed outward in the radial direction to be uniform in the circumferential direction regardless of the displacement direction of the rod 45b.

Further, an example has been described in which the slit 44d formed in the cylindrical portion 44c is parallel to the axial direction, but the present disclosure is not limited thereto. The slit may be formed along the axial direction of the cylindrical portion so that the arc piece is deformed outward in the radial direction and may be inclined with respect to, for example, the axial direction.

Further, in order to assist the electric contact between the arc piece 44e and the rod 45b, an auxiliary member that applies an elastic force in a direction in which the arc piece 44e is decreased in diameter may be provided. For example, the auxiliary member may be an elastic cylindrical member that is disposed on the outer periphery of the arc piece 44e (the cylindrical portion 44c). Such an auxiliary member may be provided in a part of the axial direction.

Further, an example has been described in which the diameter of the rod 45b is uniform in the axial direction, but the present disclosure is not limited thereto. For example, the diameter of the rod may be different at one end side and the other end side. In this case, the inner diameter of the cylindrical portion of the inverter side connector and the inner diameter of the cylindrical portion of the motor side connector may be different from each other to correspond to the diameters of the rods to be fitted.

Further, the base end of the slit of the connector may be provided with an escape portion having a shape of suppressing the concentration of stress due to the deformation of the arc piece. FIGS. 7(a) and 7(b) are perspective views illustrating a modified example of the connector. For example, as illustrated in FIG. 7(a), a connector 343 includes an escape portion 345 formed at the base end of the slit 44d. The escape portion 345 is formed in a circular shape to have a diameter larger than the width of the slit 44d. Further, as illustrated in FIG. 7(b), the connector 443 includes an escape portion 445 formed at the base end of the slit 44d. The escape portion 445 is formed with the same diameter as the width of the slit 44d and is formed in a semi-circular shape smoothly connected to the slit. Such an escape portion does not include a portion which is bent so that an angle on the side of the slit 44d is inferior at a boundary between the slit 44d and the arc piece 44e (that is, the peripheral edge of the slit 44d). With such a configuration, a crack propagation or a crack occurrence at the base end of the slit 44d is not easily caused against the deformation of the arc piece 44e in accordance with the displacement of the rod.

INDUSTRIAL APPLICABILITY

According to the electric turbocharger of the present disclosure, it is possible to suppress the breakage of the glass portion in the hermetic sealing.

REFERENCE SIGNS LIST

1: electric turbocharger, 7: motor housing, 9c: through-hole, 13: compressor impeller (rotating blade), 20: electric motor, 30: inverter (controller), 40: power supply mechanism, 41: inverter side busbar (first busbar), 43: inverter side connector (first connector), 44c: cylindrical portion, 44d: slit, 45b: rod, 47: motor side connector (second connector), 49: motor side busbar (second busbar).

The invention claimed is:
1. An electric turbocharger comprising:
an electric motor which rotationally drives a rotating blade;
a motor housing which accommodates the electric motor therein;
a controller which is disposed outside the motor housing and controls the driving of the electric motor; and
a power supply mechanism which supplies a current from the controller to the electric motor through a through-hole communicating with an inside and an outside of the motor housing,
wherein the power supply mechanism includes a rod which is hermetically sealed while being inserted through the through-hole, a connector which is connected to at least one end of the rod, and a busbar which is connected to the connector, and
wherein the connector absorbs a relative positional displacement of the rod with respect to the connector,
wherein the connector includes a cylindrical portion, and
wherein the cylindrical portion is provided with one or a plurality of slits along an axial direction.
2. The electric turbocharger according to claim 1,
wherein the the one or the plurality of slits is formed in the cylindrical portion of the first connector at the same pitches in the circumferential direction,
wherein the the one or the plurality of slits is formed in the cylindrical portion of the second connector as many as the one or the plurality of slits of the first connector at the same pitches in the circumferential direction, and
wherein the one or the plurality of slits of the first connector and the one or the plurality of slits of the second connector are alternately arranged as viewed in the axial direction of the rod.

3. The electric turbocharger according to claim 1,
wherein a pair of the slits is formed at opposite positions in the circumferential direction of the cylindrical portion of the first connector,
wherein a pair of the slits is formed at opposite positions in the circumferential direction of the cylindrical portion of the second connector, and
wherein the circumferential positions of the pair of slits of the first connector and the circumferential positions of the pair of slits of the second connector are displaced from each other by 90° as viewed in the axial direction of the rod.

4. The electric turbocharger according to claim 1,
wherein a pair of the slits is formed at opposite positions in the circumferential direction of the cylindrical portion of the first connector,
wherein a pair of the slits is formed at opposite positions in the circumferential direction of the cylindrical portion of the second connector, and
wherein the circumferential positions of the pair of slits of the first connector and the circumferential positions of the pair of slits of the second connector are displaced from each other by 90° as viewed in the axial direction of the rod.

5. An electric turbocharger comprising:
an electric motor which rotationally drives a rotating blade;
a motor housing which accommodates the electric motor therein;
a controller which is disposed outside the motor housing and controls the driving of the electric motor; and
a power supply mechanism which supplies a current from the controller to the electric motor through a through-hole communicating with an inside and an outside of the motor housing,
wherein the power supply mechanism includes a rod which is hermetically sealed while being inserted through the through-hole, a first connector which is connected to one end of the rod and is provided with one or a plurality of slits along an axial direction, a second connector which is connected to the other end of the rod and is provided with one or a plurality of slits along the axial direction, a first busbar which is connected to the first connector, and a second busbar which is connected to the second connector, and
wherein the circumferential positions of the one or the plurality of slits of the first connector and the one or the plurality of slits of the second connector with respect to the rod do not match each other.

6. An electric turbocharger comprising:
an electric motor which rotationally drives a rotating blade;
a motor housing which accommodates the electric motor therein;
a controller which is disposed outside the motor housing and controls the driving of the electric motor; and
a power supply mechanism which supplies a current from the controller to the electric motor through a through-hole communicating an inside and an outside of the motor housing,
wherein the power supply mechanism includes a rod which is hermetically sealed while being inserted through the through-hole, a first connector which is connected to one end of the rod and is provided with one or a plurality of slits along an axial direction, a second connector which is connected to the other end of the rod and is provided with one or a plurality of slits along the axial direction, a first busbar which is connected to the first connector, and a second busbar which is connected to the second connector, and
wherein the circumferential positions of the slit of the first connector and the slit of the second connector with respect to the rod do not match each other.

* * * * *